United States Patent
Li et al.

(10) Patent No.: US 10,726,084 B2
(45) Date of Patent: Jul. 28, 2020

(54) ENTITY-FACETED HISTORICAL CLICK-THROUGH-RATE

(71) Applicant: Microsoft Technology Licensing, LLC, Redmond, WA (US)

(72) Inventors: Jia Li, Chicago, IL (US); Dhruv Arya, Sunnyvale, CA (US); Shakti Dhirendraji Sinha, Sunnyvale, CA (US); Viet Thuc Ha, Milpitas, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 498 days.

(21) Appl. No.: 14/975,616

(22) Filed: Dec. 18, 2015

(65) Prior Publication Data
US 2017/0177579 A1 Jun. 22, 2017

(51) Int. Cl.
G06F 16/00 (2019.01)
G06F 16/9535 (2019.01)
G06Q 30/02 (2012.01)

(52) U.S. Cl.
CPC ..... G06F 16/9535 (2019.01); G06Q 30/0242 (2013.01)

(58) Field of Classification Search
CPC .................................................. G06F 16/9535
USPC ........................... 707/705–780; 705/1.1–912
See application file for complete search history.

(56) References Cited

U.S. PATENT DOCUMENTS

| 8,175,726 | B2 | 5/2012 | Herbrich et al. | |
|---|---|---|---|---|
| 9,639,827 | B1 | 5/2017 | Li et al. | |
| 2006/0206517 | A1* | 9/2006 | Hyder | G06Q 30/02 |
| 2008/0114750 | A1* | 5/2008 | Saxena | G06F 17/30687 |
| 2011/0035379 | A1* | 2/2011 | Chen | G06F 17/30536 |
| | | | | 707/740 |
| 2011/0264511 | A1* | 10/2011 | Zhang | G06Q 30/02 |
| | | | | 705/14.43 |
| 2012/0011117 | A1* | 1/2012 | Tong | G06F 17/30864 |
| | | | | 707/723 |
| 2012/0030152 | A1* | 2/2012 | Pueyo | G06F 17/30867 |
| | | | | 706/12 |
| 2012/0209831 | A1* | 8/2012 | Rehman | G06F 17/3053 |
| | | | | 707/723 |

(Continued)

OTHER PUBLICATIONS

"U.S. Appl. No. 14/975,604, Non Final Office Action dated Aug. 10, 2016", 8 pgs.

(Continued)

Primary Examiner — Michelle N Owyang
(74) Attorney, Agent, or Firm — Schwegman Lundberg & Woessner, P.A.

(57) ABSTRACT

In an example embodiment, usage information is used to calculate one or more individual document historical information-deficient metrics (IDHIDMs) by combining values for the one or more metrics from multiple documents within the document corpus that share an identical combination of entities of the one or more entity types. A search query is segmented into a plurality of segments, wherein at least one of the plurality of segments is tagged as a first entity type and at least one of the plurality of segments is tagged as a second entity type. At least one for a combination of entities matching the tagged segments is used to rank one or more retrieved documents responsive to the query.

20 Claims, 12 Drawing Sheets

(56) References Cited

U.S. PATENT DOCUMENTS

2014/0214711 A1* 7/2014 Filstein .................. G06Q 10/06
705/321
2014/0272914 A1 9/2014 Baraniuk et al.
2014/0279727 A1 9/2014 Baraniuk et al.
2014/0280133 A1* 9/2014 Dulitz ................ G06Q 30/0201
707/736
2014/0317078 A1* 10/2014 Gallagher ......... G06F 17/30867
707/706

OTHER PUBLICATIONS

"U.S. Appl. No. 14/975,604, Response filed Nov. 10, 2016 to Non Final Office Action dated Aug. 10, 2016", 10 pgs.
"U.S. Appl. No. 14/975,604, Notice of Allowance dated Dec. 22, 2016", 7 pgs.
"U.S. Appl. No. 15/488,099, Preliminary Amendment filed Apr. 118, 2017", 9 pgs.

* cited by examiner

400

404            402

Software Engineer, University Grad
Company XYZ - San Francisco Bay Area

Posted 15 days ago                    406

[Apply now]  [Save]                   408

Experience                     Industry
Not Applicable                 Information Technology and Services
Job function                   Job ID
Information Technology         70702863
Employment type
Full-time Other Details

About this job

📄 Job description

Company XYZ Engineers work on all product teams from Product1 and Product2 to Online Marketing. Software Engineers at Company XYZ are researchers and developers who strive to create and implement complex computer science solutions. As a Software Engineer, you will work on our core products and services as well as those who support critical functions of our engineering operations. Depending on your interest, background and experience, you will be working in either the Digital Marketing, Digital Media or Corporate Technology Business Unit.

Desired Skills and Experience    410

- Working towards a BS or MS degree from an accredited university or college
- Computer Science, Computer Engineering, Electrical Engineering or similar technical majors with programming experience
- Strong Technical background with analytical and problem solving skills
- Ability to work with ambiguity and change
- Ability to work on diverse teams
- Experience in any of the following Computer Languages: C, C++, Java, ActionScript, Flex Python or Perl
- Past internship experience a plus

*FIG. 4*

ENTITY-FACETED HISTORICAL CLICK-THROUGH-RATE

TECHNICAL FIELD

The present disclosure generally relates to computer technology for solving technical challenges in computations of click-through-rates. More specifically, the present disclosure relates to computing entity-faceted historical click-through-rates.

BACKGROUND

Click-through-rates are measures of online usage used for various industries. To compute a click-through-rate, historical patterns of online usage from users, including usage involving selecting (also known as clicking) objects in a web browser such as links or advertisements, are examined. The click-through-rate is essentially a count of a number of clicks over some other variable (typically number of impressions, or time). One common use for click-through-rates is in ranking search results responsive to search queries. When a user performs an online search, a number of potentially matching documents can be returned and search engines or other services often will rank these results according to various metrics, including prevalence of keywords in the results and how often the result is linked by other web sites (PageRank) as well as metrics such as click-through-rate, where results that have been frequently clicked on may be ranked higher than comparable results that have not been frequently clicked on. While for the most part calculations of click-through-rates are fairly straightforward, there are certain areas where the calculations become more tricky. One such area is in measuring click-through-rates for objects that have a limited lifespan, and thus there may not be enough, or even any, historical usage data to make useful conclusions about those limited-lifespan objects. One such limited lifespan object is a job posting.

In recent years it has become more and more prevalent for job hunters to utilize the Internet to perform their job search, typically by performing searches on job listings posted online by hiring companies and/or recruiters. Because job postings are usually only posted for a limited time (e.g., until the job opening is filled), it can be difficult to obtain historical usage information for individual job postings. In light of this, the technical calculations used to rank job postings responsive to a search may be inaccurate because they are based on click-through-rates of job listings with little or no historical usage information.

BRIEF DESCRIPTION OF THE DRAWINGS

Some embodiments of the technology are illustrated, by way of example and not limitation, in the figures of the accompanying drawings.

FIG. 4 is a screen capture illustrating a job posting, in accordance with an example embodiment.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a solution is provided that infers historical click-through-rates (CTRs) for documents that do not have enough historical data themselves to accurately compute CTR. This inference is based on an entity-faceted design where entity types in documents are identified and tagged onto entities during indexing of the documents. When a search is performed on these indexed documents, rather than compute a single historical CTR separately for every document in the corpus, historical CTRs are computed across one or more different entity-facets. In the case of job postings, these entity-facets may include, for example, title, company, location, and the like.

In another example embodiment, one or more other metrics other than CTR are computed using the entity-faceted design described above, and in fact nothing in this disclosure shall be read as limiting the scope of protection to CTR calculation alone. Indeed, any metric calculated based on historical usage information where the historical usage information for individual documents may be lacking in some way can benefit from the entity-faceted design solution.

Figure 1:
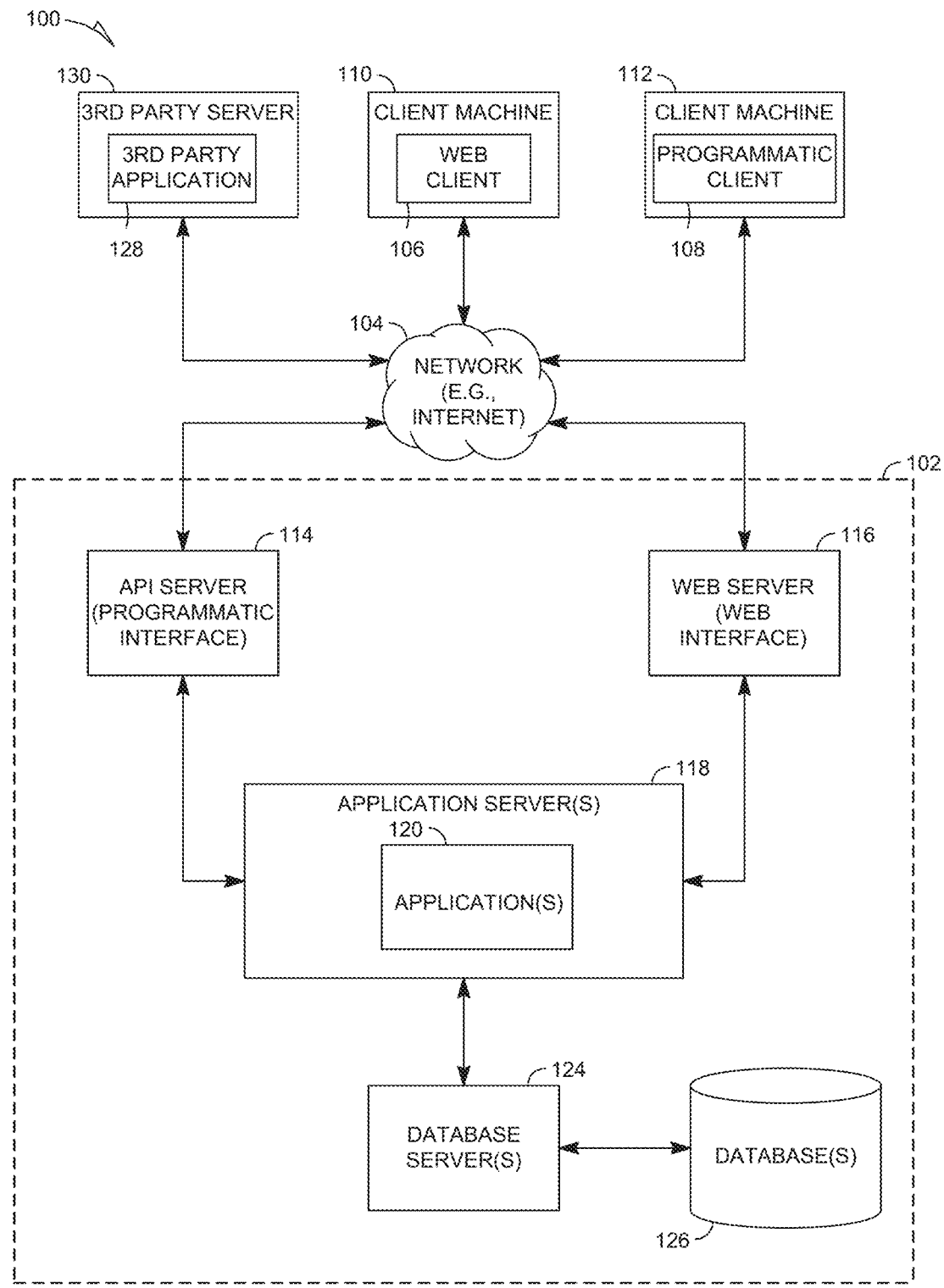
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 19 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
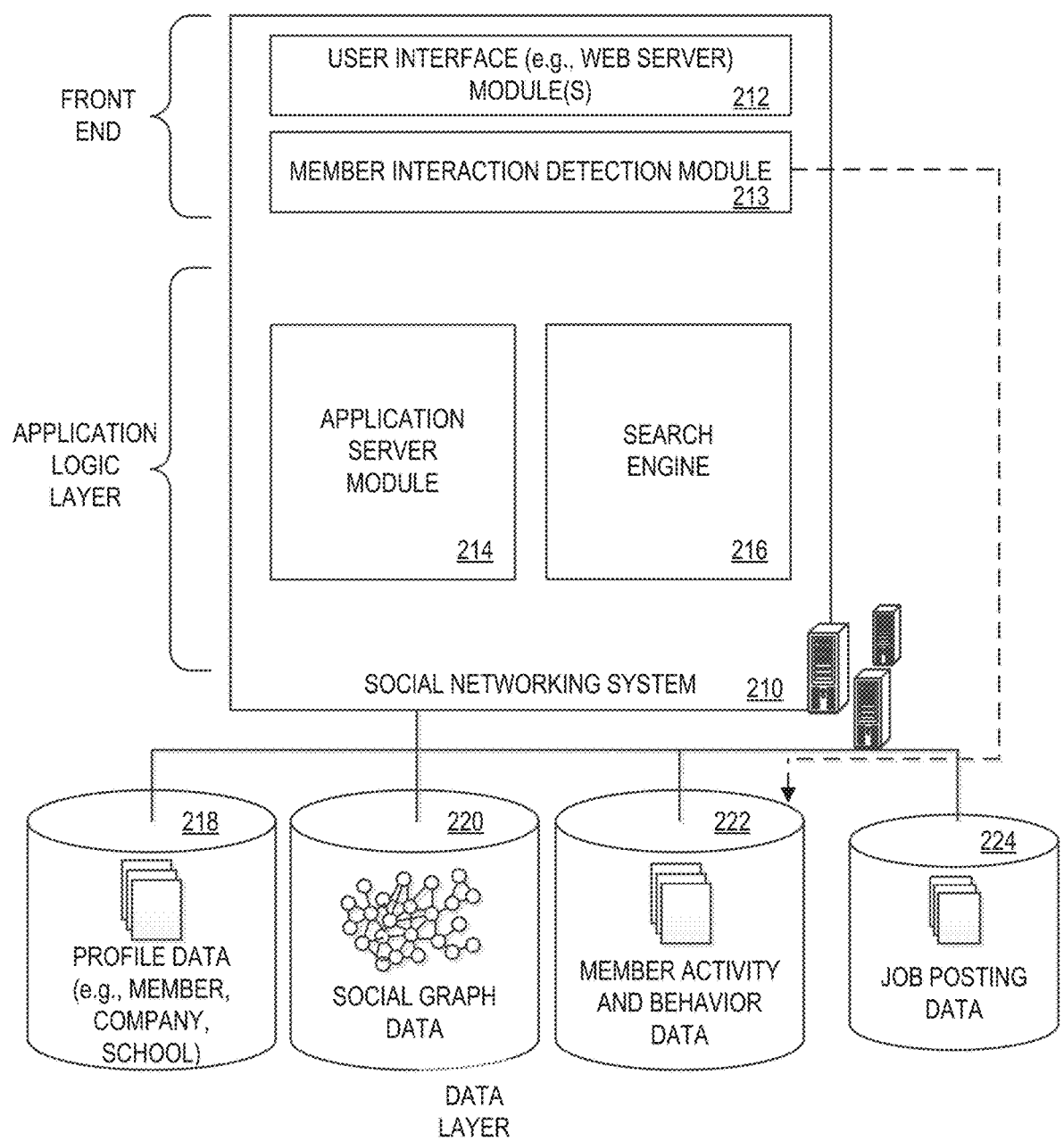
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the organization operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Companies, recruiters, or other individuals or organizations may then post job postings to the social networking system. These job postings may be stored in job posting database 224 and may be available to members of the social networking system 210 for search, perusal, and application.

As mentioned above, when a user issues a query like "software engineer Cambridge Company XYZ" to the job posting database 224, the user implicitly links the keywords to different entity types such as title, location, and company, and expects the results to match the information need in terms of the structure he or she has in mind, but from a technical viewpoint this can be a challenge to accomplish. In an example embodiment, documents are indexed in a structured way. At searching time, the user query is segmented and linked to one of the typed entities used in the document index. Then, various features are constructed matching typed entities mentioned in the query with the corresponding ones in the documents.

To aid job seekers in searching and discovering jobs, in an example embodiment, a search index is built on some of the key attributes of the job. Jobs may be thought of as being structured on several key attributes, including job title, company, location, industry, and skills. When a job is posted to the system, a standardizer may be used to extract out standardized entities from the job posting document. The extracted entities are based on curated dictionaries built over time from member profiles. The standardizer is engineered through multiple iterations to understand which parts of the job posting are critical for different entities. The standardized job posting is then indexed and becomes searchable on both the entities as well as the free text as entered.

Figure 3:
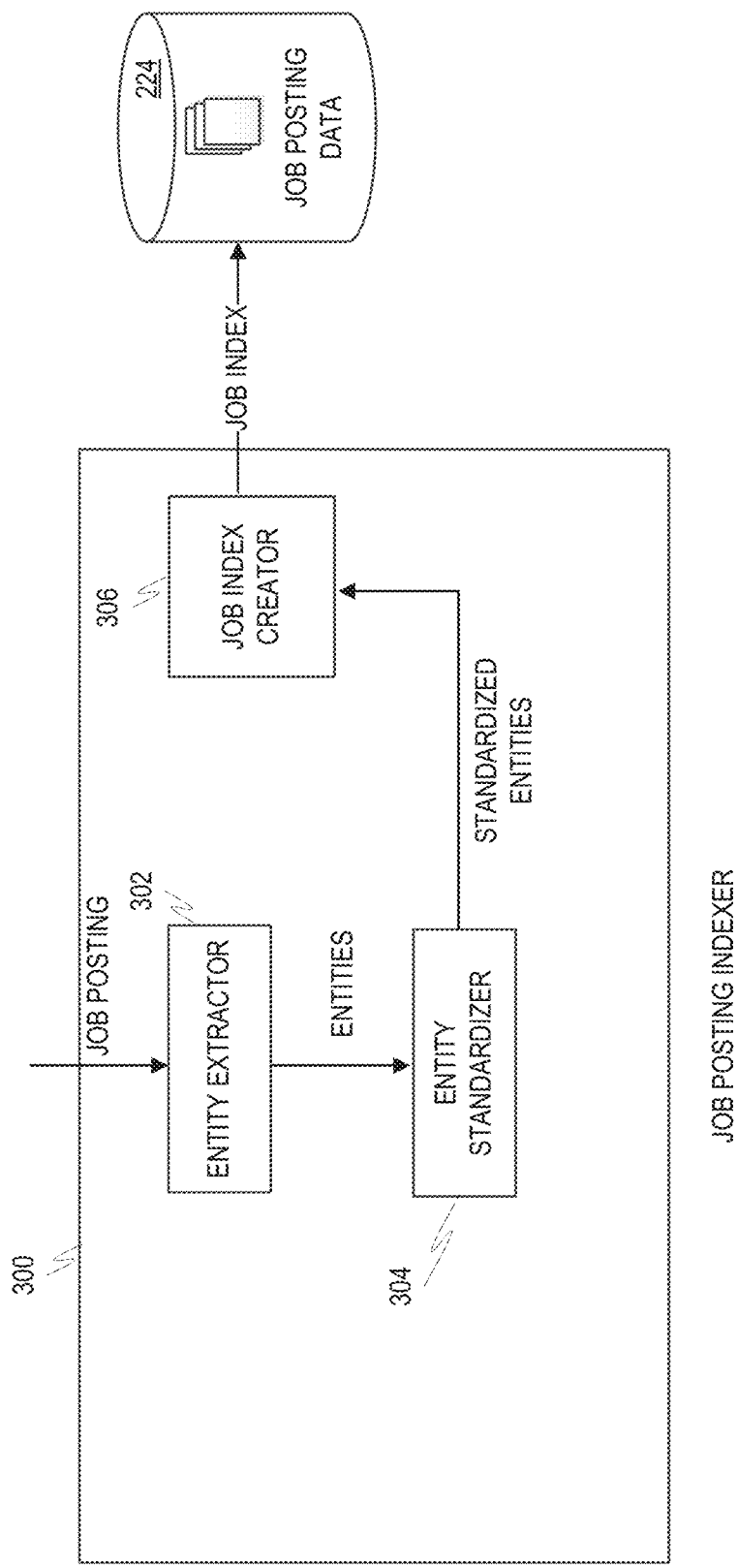
FIG. 3 is a block diagram illustrating a job posting indexer, in accordance with an example embodiment.

FIG. 3 is a block diagram illustrating a job posting indexer 300, in accordance with an example embodiment. The job posting indexer 300 may be located inside the application server module 214 of FIG. 2. The job posting indexer 300 may include an entity extractor 302, an entity standardizer 304, and a job index creator 306. The entity extractor 302 identifies entities within a job posting that match a set of predefined entities and extracts those entities from the job posting. The predefined entities may be specified by an administrator, and the algorithm used by the entity extractor 302 to identify those features in a job posting may be an algorithm trained through machine learning, as will be described in more detail below. The entity standardizer 304 then standardizes the extracted entities so that entities that actually mean the same thing but are worded differently are treated the same. Thus, "software engineer," "software programmer," "software engineering," and the like may all be standardized to "software engineer." The normalized extracted entities from the job posting are then indexed by the job index creator 306 inside job posting database 224.

FIG. 4 is a screen capture illustrating a job posting 400, in accordance with an example embodiment. As described above, the entity extractor 302 may be programmed to look for several particular entities, including job title 402, company 404, location 406, industry 408, and skills 410 and extract them from the job posting.

Figure 5:
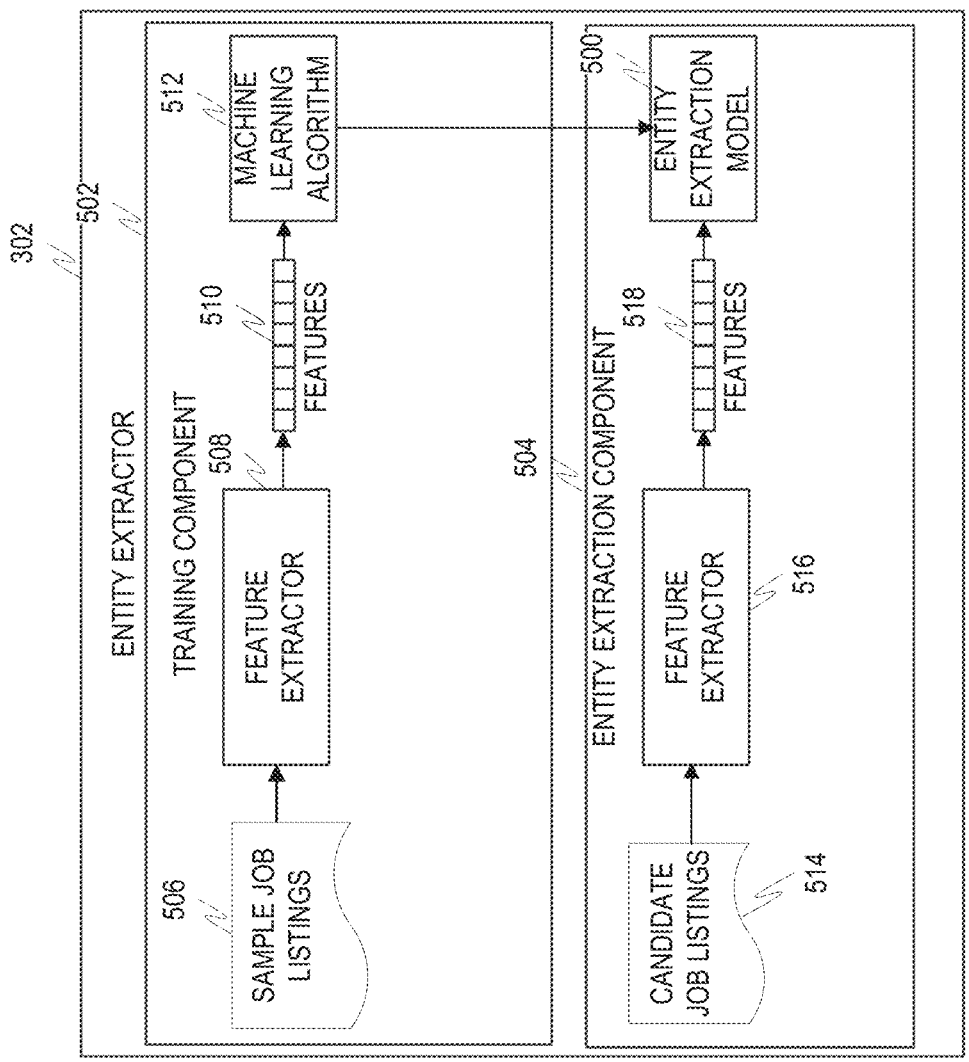
FIG. 5 is a block diagram illustrating an entity extractor, in accordance with an example embodiment.

FIG. 5 is a block diagram illustrating an entity extractor 302, in accordance with an example embodiment. The entity extractor 302 may utilize machine learning processes to arrive at entity extraction model 500 used to extract entities from job postings. The entity extractor may comprise a training component 502 and an entity extraction component 504. The training component feeds sample job listings 506 into a feature extractor 508 that extracts one or more features 510 for the job listings 506. These features 510 are measurements useful in differentiating entities from one another and entities from non-entity information. For example, the features 510 may include, for each unit of text in the job listing, a location of the unit of text with respect to the job listing (because, for example, the job title entity may typically be located somewhere near the top of the job listing). The features 510 may also include, for example, metadata accompanying a unit of text, as well as terms surrounding the unit of text (also known as context). The features 510 are then fed into a machine learning algorithm 512, which acts to interpret the features as well as one or more labels provided by human administrators to learn how to identify which features of a unit of text are relevant to determining to which entity type the unit of text may correspond. The machine learning algorithm 512 produces the entity extraction model 500. In the entity extraction component 504, candidate job listings 514 are fed to a feature extractor 516 that extracts one or more features 518 from the candidate job listings 414. In an example embodiment, features 518 are identical to the features 510, although the values for the features will of course vary based on the job listings input.

Figure 6:
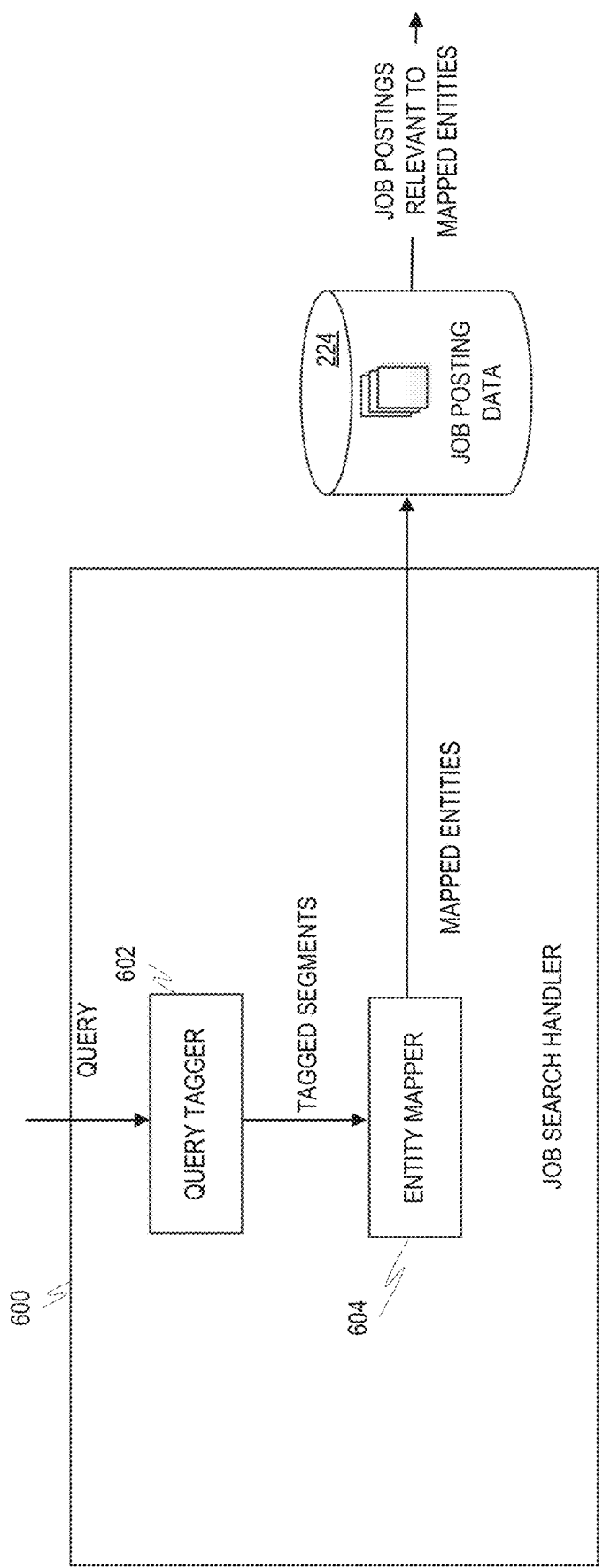
FIG. 6 is a block diagram illustrating a job search handler, in accordance with an example embodiment.

FIG. 6 is a block diagram illustrating a job search handler 600, in accordance with an example embodiment. The job search handler 600 may be located inside the application server module 214 of FIG. 2. When a searcher enters a query, a query tagger 602 is employed to segment the query and tag the segments into entity types that are important to the job search domain. In an example embodiment, these important entity types match the predetermined entities described above with respect to FIG. 3. Thus, these important entity types may include job title, company, location, industry, and skills. Thus, for example, the search query "software engineer Cambridge CompanyXYZ" may be segmented into "software engineer," "Cambridge," and "CompanyXYZ." "Software engineer" may be tagged as the type "job title," "Cambridge" may be tagged as the type "location," and "Company XYZ" may be tagged as the type "company."

The next step is to map the segments into specific entities. An entity mapper 604 may match the segments against a dictionary of corresponding types. Some segments may be ambiguous—Cambridge, for example, may refer to Cambridge, Mass. or Cambridge, England. A profile extracted for the searcher may be used to resolve ambiguities in a personalized way. For example, if the searcher is currently residing in the United States, the entity mapper 604 will be more likely to map Cambridge to Cambridge, Mass. than Cambridge, England. Likewise, the skills of the searcher (as denoted in the searcher's member profile) can be used to determine resolve a particular ambiguous job title (e.g., "engineer" refers to "Software engineer" because the searcher has many software-related skills as opposed to a "structural engineer," of which the searcher has no related skills).

Given typed entities mentioned in user queries and in job posting documents, entity-aware features are then constructed to capture the semantic similarity between the queries and the job posting documents. In particular, entities in the queries are matched with entities of the same types in the job posting documents. For example, the title entity of "software engineer" from a query is matched with the title entity in each job posting document. Similarly, the company entity of "CompanyXYZ" from the query is matched with the company entity in each job posting document. There are two types of matching: hard matching and soft matching. Hard matching determines whether the two entities (one in the query and one in the job posting document) have the same identifier. Notably, hard matching is still able to capture synonymy relationships amongst different textual forms of the same entities (e.g. "software engineer" and "software developer").

In soft matching, semantic similarity between two different but related standardized entities are considered, such as between "software engineer" and "software architect" or between the skill of "information retrieval" and "web search." To measure such similarity, an approach leveraging the member profiles, and specifically the co-occurrence of entities in these member profiles, is used. For example, if two skills tend to occur in similar groups of members, the two skills are likely to be related and may be considered a "soft match."

Thus, to complement a user query that may not be enough alone to represent user information need and interest, the idea of expertise homophile is exploited to capture the similarity between the searcher's expertise (as defined by skills) and job expertise requirements to make job search results more personally relevant.

In the social network, a node tends to be connected or interact with other nodes that are similar to it. In the context of a job search, in an example embodiment, a job searcher tends to be interested in the jobs that require similar expertise as his or hers. Members of a social network may be permitted to add skills to their profiles. These skills may be among thousands of standardized skills. Members can also endorse skills of other members in their network.

At runtime, when a search query is run on the job posting database, the results returned may be ranked. This ranking, as described above, may be based on a number of different factors, including CTR or other metrics that, if measured based on individual documents, may result in inaccurate conclusions due to lack of sufficient usage information for the metric in the individual documents. These types of metrics may be known as "individual document historical information-deficient metrics," or IDHIDMs.

In an example embodiment, given a job corpus, such as a series of returned job posting documents, multiple IDHIDMs may be computed based on different facets of the documents. These facets may include, for example, title, company, or location. For example, historical CTR can be computed for all jobs with a specific title (e.g., "computer scientist") at a specific company (e.g., "Company XYZ") at a specific location (e.g., "Mountain View, Calif."). Thus, the popularity of other past job postings having those same entities may be used to infer a CTR for a particular current job posting result having those same entities.

It is worth noting that the entities themselves, having been standardized, are not examined at a text level but are examined at an identification level. Thus, job listings identifying different names for the same company are grouped together in the same bucket. Similarly, jobs with different title variations of the same title entity such as "software engineer," "software developer," software development engineer," and "SDE" are also grouped together. Grouping the jobs at entity level not only makes the facet more meaningful, but also further reduces the issue of data sparseness.

In an example embodiment, groupings of similar entities may be expanded to include entities that are not strictly similar but are related in some other fashion. For example, multiple company names under a single conglomerate name may be grouped together, despite the fact that these names may be significantly different from one another (e.g., "Subsidiary Corp." and "Tiny Co." may be grouped together if both are subsidiaries of "Company XYZ"). Likewise, cities that are close to each other (e.g., "Mountain View, Calif." and "Sunnyvale, Calif.") may be grouped together despite the fact that these names may be significantly different from one another.

The entity-faceted CTRs may be computed based on the number of times the job postings belonging to the entity got clicked and the number of times these jobs were shown on search results. This formula is represented as:

$$CTR = \frac{(\#clicks + \lambda * N)}{(\#impressions + N)}$$

The default value $\lambda$, controls an interesting trade-off for the cases where the number of impressions are low even when factoring in the entity-faceted design, such as jobs from a new company. If too small a default value is used, the new jobs that were previously shown have little chance to be shown, which results in members not even exploring these job postings, which then leads to future impressions being low. However, many of these job postings may be relevant results for the members and could be clicked if shown. On the other hand, if λ, is assigned a value that is too high, historical CTRs become too smooth and not much of the insight from member historical actions is exploited.

As such, in an example embodiment, a machine learning algorithm is used to tune the value for λ. Specifically, each instance in a data set of search results contains a feature vector and a graded relevance label. The label indicates how relevant the result is to the query and the searcher. For each entity-faceted historical CTR (e.g., company-faceted historical CTR), the value for λ is selected that maximizes the correlation between the CTR and the labels, as follows:

$$\lambda = \frac{\text{argmax}}{\lambda} \text{Correlation}(CTR, \text{label})$$

In an example embodiment, existing features are generally divided into three categories: textural features, geographic features, and social features. The most traditional type of features is textural features. These features match the keywords in queries with different sections of a job description.

Geographic features relate to the location of the searcher/job opening. Social features indicate how the results socially relate to the searcher, based on factors such as how the searcher socially connects with the company posting the job (e.g., if her or she follows the company or has friends working at the company).

A traditional way to obtain training data is to use human experts to label the results. However, given a large training data set for a personal search, it is expensive to use human experts. At the same time, it is very hard for people other than the searcher to know the true relevance of the results. For example, for the query of "software engineer," a new college graduate in the U.S. and an experienced candidate in Canada could be interested in very different results. In an example embodiment, log data is used as implicit feedback from searchers to generate training data. Log data comprises information about how users interact with results, such as which results they click on and for which of the underlying jobs associated with the job postings they apply.

Figure 7:
FIG. 7 is a diagram illustrating filtering of job posting results from training data, in accordance with an example embodiment. As described above, the top results that have been applied for by a corresponding member, such as result 700, are considered perfect results.

One problem with log data is something known as "position bias," as users tend to interact with top results. Thus, labels inferred from user actions may be biased towards the ranking function generating the data. In order to counter the position bias, in an example embodiment, search results are randomized and shown to a small percentage of traffic. Additionally, log data may include not just information such as which documents the searcher clicked on but also for which job positions the searcher applied. Applying is a stronger signal of relevance than clicking, and thus a higher label may be assigned to applied results (considered as perfect results) and a lower label to clicked results (considered as good results). Results that received no interaction at all are considered as bad results, although for results shown below the last interacted one, it cannot be determined whether the searcher deliberately did not interact with these results or whether the searcher did not look at them. In an example embodiment, results shown below the last result to be interacted with are discarded. FIG. 7 is a diagram illustrating filtering of job posting results from training data, in accordance with an example embodiment. As described above, the top results that have been applied for by a corresponding member, such as result 700, are considered perfect results. Top results that have not been applied for but have been clicked on, such as result 702, are considered good results. Results such as 704 and 706 that are higher than the lowest ranked interacted-with result (which here is result 700) but that themselves have not been interacted with are considered poor results, while any results below the lowest ranked interacted-with result (which here would include results 708 and 710) are simply ignored.

Given the training data set, Coordinate Ascent may be applied. Coordinate Ascent is a listwise learning-to-rank algorithm used to search for an optimal model. For efficiency purposes, linear models may be used. One key benefit of listwise learning-to-rank approach over pointwise and pairwise approaches is that the listwise approach can optimize ranking-based metrics directly. An objective function optimized in the learning process may be normalized discounted accumulative gain defined on the graded relevance labels, as described above The above features are then integrated into a job search ranking function. Specifically, a learning-to-rank approach is applied to learn a new ranking function that combines the entity-aware features with existing features.

Learning to rank, also known as machine-learned ranking, is an application of machine learning, typically supervised, semi-supervised, or reinforcement leaning. Training data comprises lists of items with some partial order specified between items in each list. This order is typically induced by giving numerical or ordinal score or a binary judgement for each item. The ranking model's purpose is to rank, e.g., produce a permutation of items in lists in a way which is similar to the rankings in the training data in some sense.

In order to handle the computationally complex task of calculation of IDHIDMs, in an example embodiment, a two-phase approach is applied. An offline process periodically runs on distributed computing platforms to calculate IDHIDMs for various frequently searched-for entities. The online phase then consumes the latest version of these IDHIDMs at ranking time.

Figure 8:
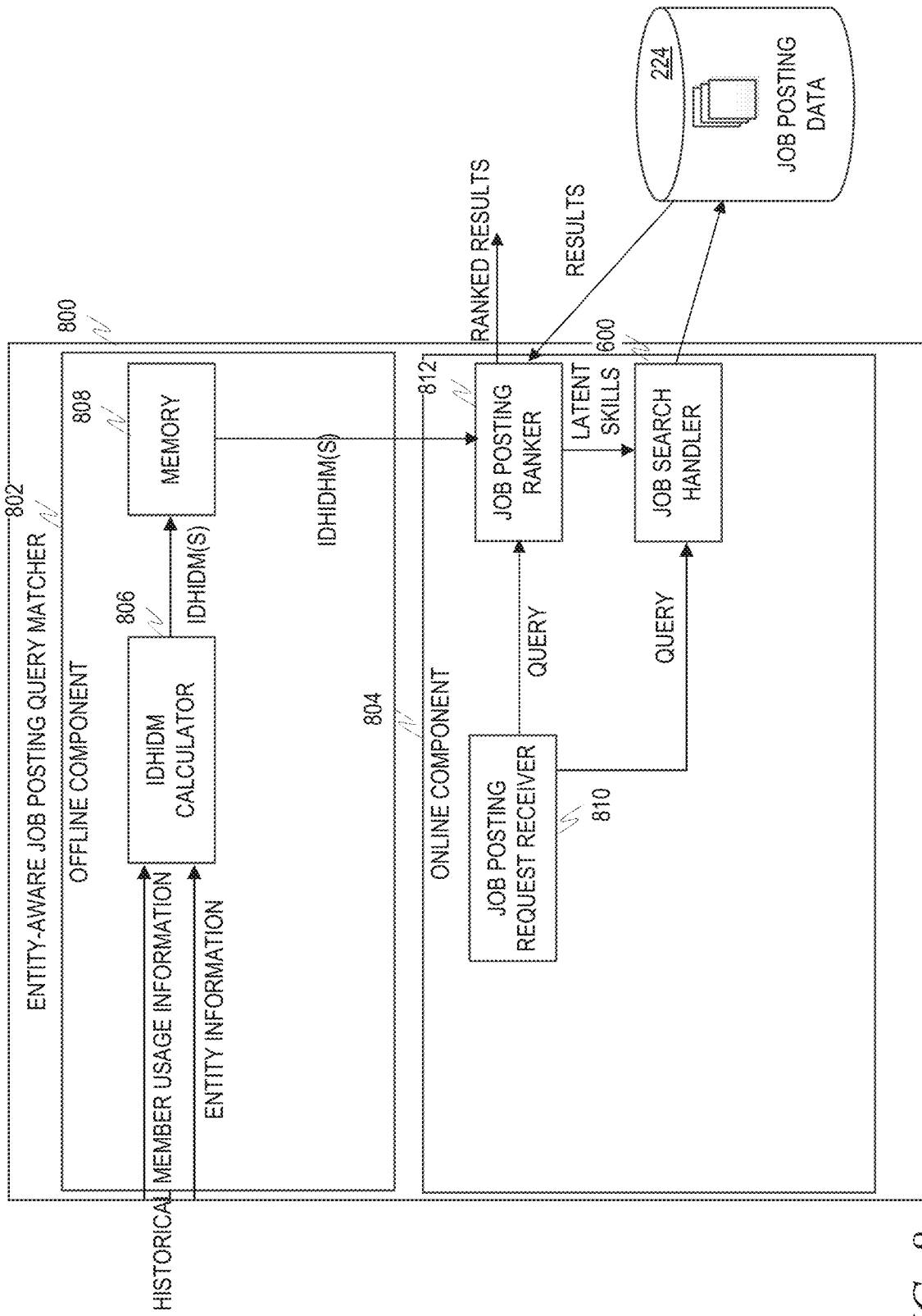
FIG. 8 is a block diagram illustrating an entity-aware job posting query matcher, in accordance with an example embodiment.

FIG. 8 is a block diagram illustrating an entity-aware job posting query matcher 800, in accordance with an example embodiment. The entity-aware job posting query matcher 800 may be located inside the application server module 214 of FIG. 2. The entity-aware job posting query matcher 800 may include an offline component 802 and an online component 804. The offline component 802 pre-computes IDHIDMs for various entities. In this embodiment, this means that the offline component 802 performs its work independently of any interactions a member may have with the social networking service, such as performing a job posting query. Specifically, using historical member usage information and information about entities in the job domain, an IDHIDM calculator 806 calculates IDHIMs for combinations of various entities in the job domain. These IDHIMs may be stored in memory 808.

At runtime, the online component 804 uses these calculated IDHIMs to rank job postings responsive to a query. Specifically, the online component 804 includes a job posting request receiver 810, which receives a query for job postings that may be relevant to a particular member (as described above, the query may be sent from the member, although this is not strictly necessary). A job search handler 600 may then perform a search using the query on job posting data 224, which may result in job postings relevant to mapped entities from the search query. A job posting ranking component 812 may then rank the returned job postings based at least in part on the IDHIDM(s) stored for the particular combination of mapped entities. Specifically, the job posting ranking component 812 may use the mapped entities to retrieve appropriate IDHIM(s) stored in the memory 808 that match the mapped entities. In some example embodiments, the job posting ranking component 812 may interface directly with the IDHIDM calculator 806 to request IDHIDM calculations on-the-fly if, for example, memory 808 does not contain an IDHIDM for the corresponding combination of mapped entities. The job posting ranking component 812 may then rank the responsive job queries based at least partially on these IDHIDM(s).

Figure 9:
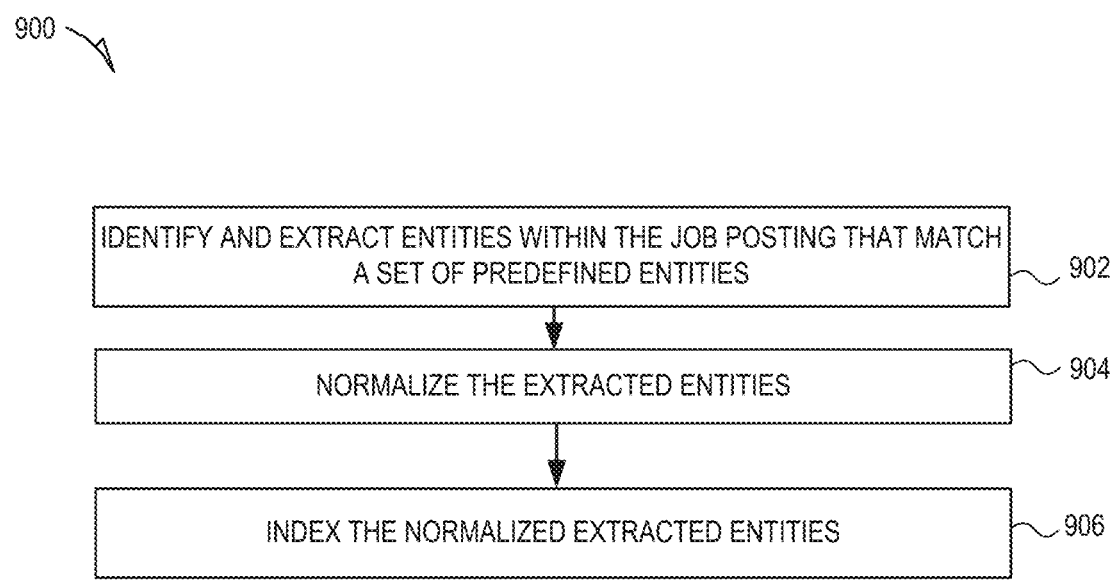
FIG. 9 is a flow diagram illustrating a method of indexing a job posting indexer, in accordance with an example embodiment.

FIG. 9 is a flow diagram illustrating a method 900 of indexing a job posting indexer, in accordance with an example embodiment. At operation 902, entities within the job posting that match a set of predefined entities are identified and extracted from the job posting. The predefined entities may be specified by an administrator. At operation 904, the extracted entities are normalized so that entities that actually mean the same thing but are worded differently are treated the same. At operation 906, the normalized extracted entities from the job posting are indexed.

Figure 10:
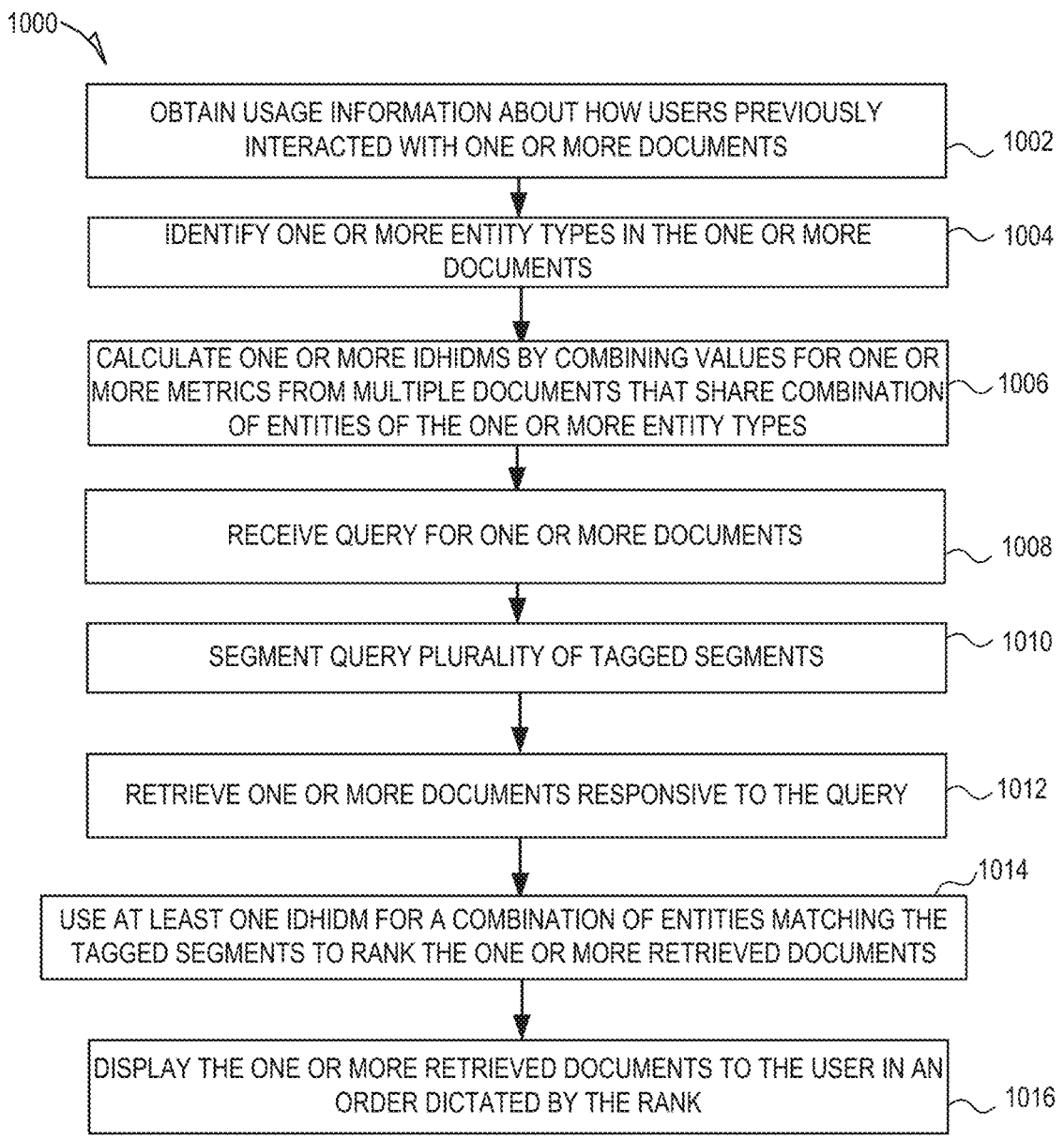
FIG. 10 is a flow diagram illustrating a method of automatically calculating online metrics, in accordance with an example embodiment.

FIG. 10 is a flow diagram illustrating a method 1000 of automatically calculating online metrics, in accordance with an example embodiment. At operation 1002, usage information about how users previously interacted with one or more documents in a document corpus is obtained. At operation 1004, one or more entity types in the one or more documents in the document corpus are identified. At operation 1006, one or more IDHIDMs are calculated by combining values for the one or more metrics from multiple documents within the document corpus that share an identical combination of entities of the one or more entity types.

At operation 1008, a search query is received for one or more documents. At operation 1010, the search query is segmented into plurality of segments, wherein at least one of the plurality of segments is tagged as a first entity type and at least one of the plurality of segments is tagged as a second entity type. At operation 1012, one or more documents responsive to the query are retrieved from the document corpus by comparing the tagged segments to index terms of the same entity types. At operation 1014, at least one IDHIDM for a combination of entities matching the tagged segments is used to rank the one or more retrieved documents. At operation 1016, the one or more retrieved documents are displayed to the user in an order dictated by the rank.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-10 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 11:
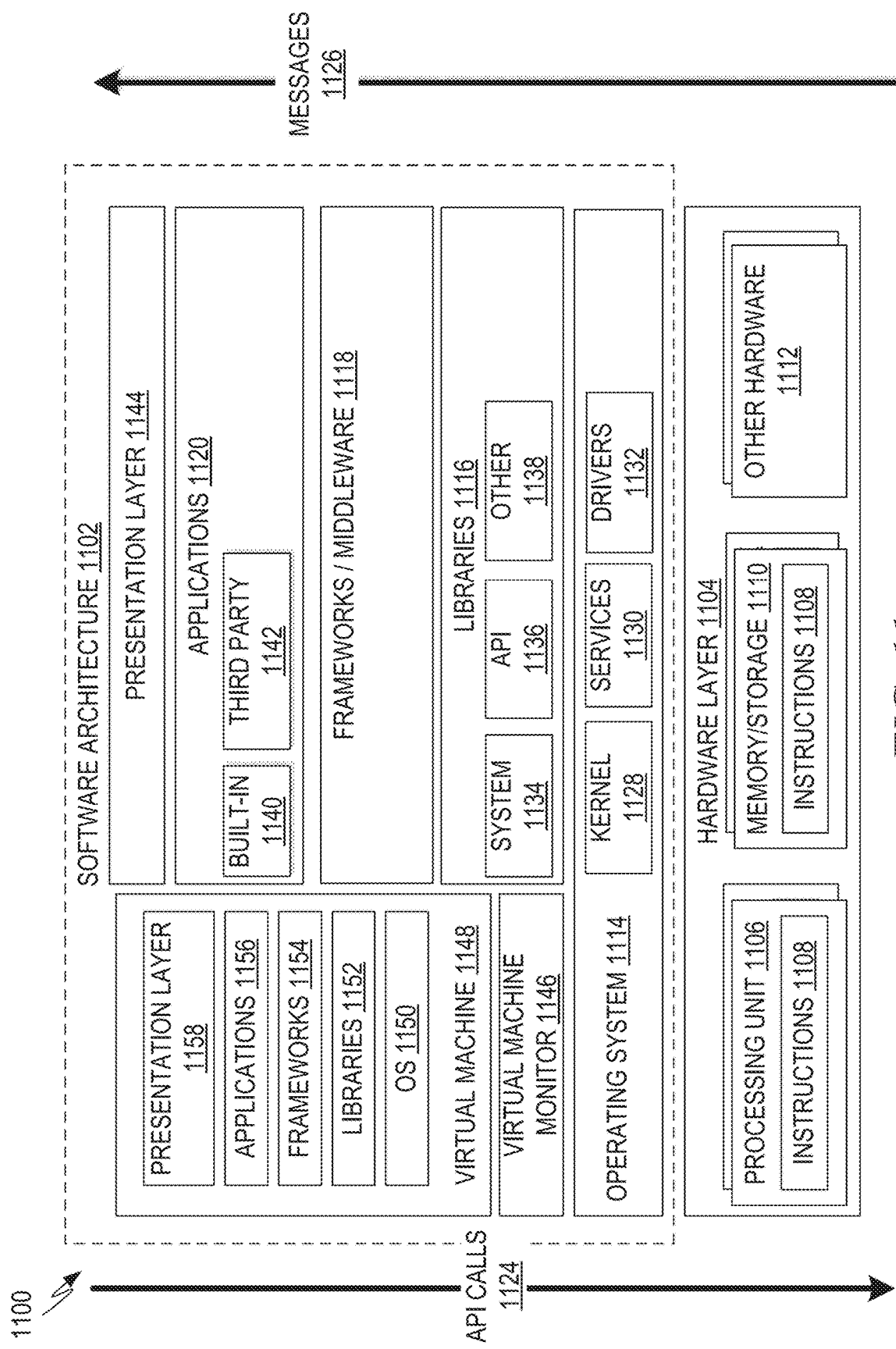
FIG. 11 is a block diagram illustrating a representative software architecture, which may be used in conjunction with various hardware architectures herein described.

FIG. 11 is a block diagram 1100 illustrating a representative software architecture 1102, which may be used in conjunction with various hardware architectures herein described. FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory/storage 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102, including implementation of the methods, modules, and so forth of FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke API calls 1124 through the software stack and receive responses, returned values, and so forth, illustrated as messages 1126, in response to the API calls 1124. The layers illustrated are representative in nature and not all software architectures have all layers. For example, some mobile or special purpose operating systems may not provide a layer of frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system 1134 libraries (e.g., C standard library) that may provide functions such as memory allocation functions, string manipulation functions, mathematic functions, and the like. In addition, the libraries 1116 may include API 1136 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third party applications 1142. Examples of representative built-in applications 1140 may include, but are not limited to, a contacts application, a browser application, a book reader application, a location application, a media application, a messaging application, and/or a game application. The third party applications 1142 may include any of the built-in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system, such as the operating system 1114, to facilitate functionality described herein.

The applications 1120 may utilize built-in operating system 1114 functions (e.g., kernel 1128, services 1130, and/or drivers 1132), libraries 1116 (e.g., system 1134, APIs 1136, and other libraries 1138), and frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. A virtual machine creates a software environment where applications/modules can execute as if they were executing on a hardware machine (such as the machine 1200 of FIG. 12, for example). A virtual machine is hosted by a host operating system (e.g., operating system 1114 in FIG. 11) and typically, although not always, has a virtual machine monitor 1146, which manages the operation of the virtual machine as well as the interface with the host operating system (e.g., operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Example Machine Architecture and Machine-Readable Medium

Figure 12:
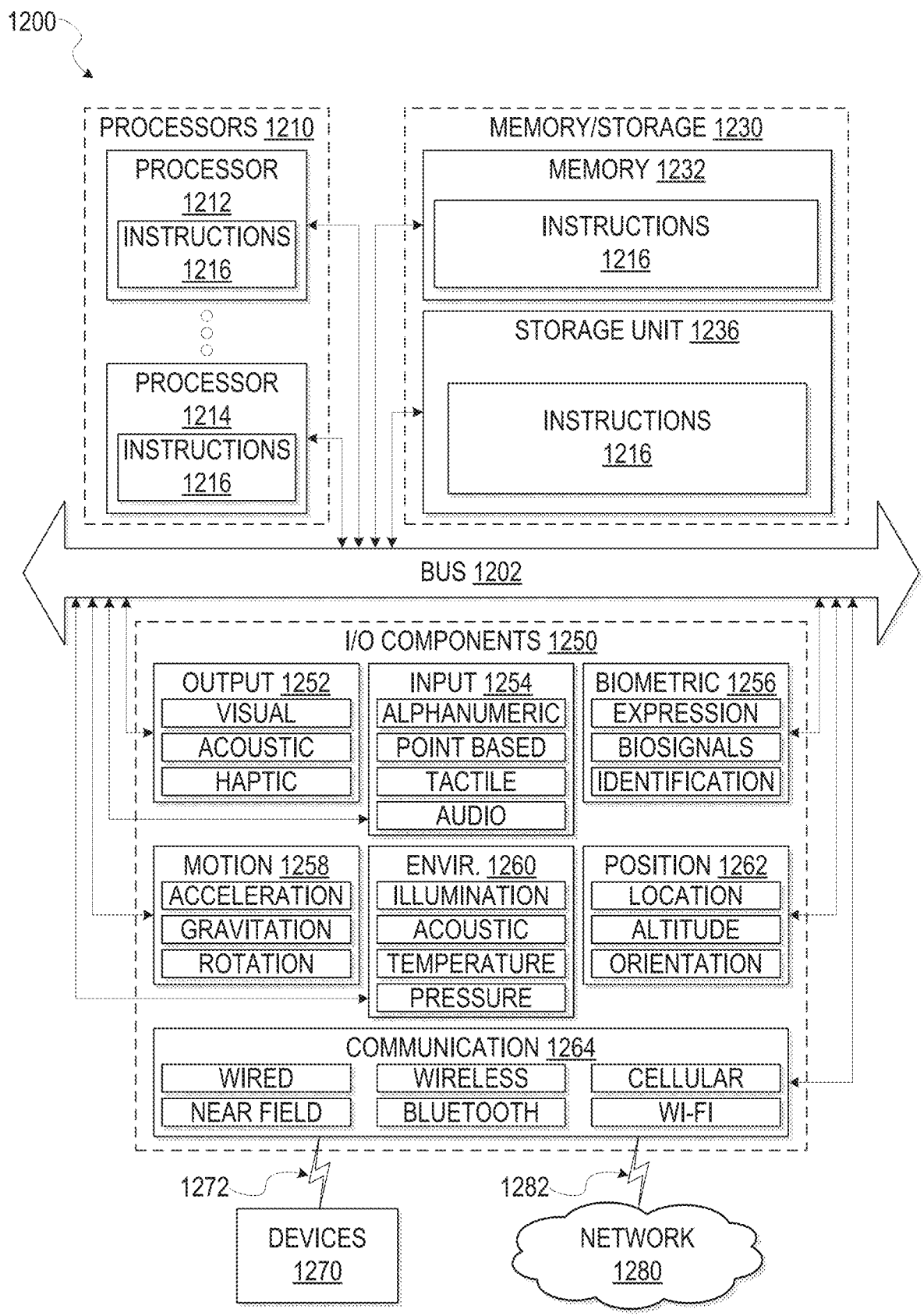
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210, such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions

1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or other suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a UnivUSB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS)

technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method for automatically calculating online metrics, comprising:
   obtaining usage information about how users previously interacted, via a first user interface of an electronic device, with a plurality of limited lifespan objects in a database of objects, wherein a limited lifespan object of the plurality of limited lifespan objects corresponds to a respective document in a document corpus for which an accurate click-through-rate cannot be determined based on historical data related to the document;
   identifying entity types of the plurality of limited lifespan objects;
   calculating one or more individual document historical information-deficient metrics (IDHIDMs) for each of the plurality of limited lifespan objects;
   creating a plurality of groupings including a set of limited lifespan objects of the plurality of limited lifespan objects corresponding to documents that share an identical combination of entity types;
   combining values for two or more IDHIDMs corresponding to a group of limited lifespan objects in each grouping of the plurality of groupings into a single combined metric for the respective grouping;
   receiving a search query, via a second user interface, for one or more documents;
   segmenting the search query into a plurality of segments, wherein at least one of the plurality of segments is tagged as a first entity type and at least one of the plurality of segments is tagged as a second entity type;
   retrieving from the database in response to receiving the search query, the set of limited lifespan objects by comparing the tagged segments to index terms having identical entity types as the first entity type and the second entity type;
   determining, using respective ones of the single combined metric for one or more groupings of limited lifespan objects matching the tagged segments, a rank of each limited lifespan object of the set of limited lifespan objects; and
   displaying the documents corresponding to the set of limited lifespan objects in response to receiving the search query to the user in an order dictated by the rank.

2. The method of claim 1, wherein the single combined metric is click-through-rate (CTR).

3. The method of claim 1, wherein the one or more documents are job postings.

4. The method of claim 3, wherein job postings are indexed in a job posting database using terms extracted from the job postings and assigned a plurality of different entity types.

5. The method of claim 1, wherein the obtaining, identifying, and calculating are performed offline.

6. The method of claim 1, wherein the calculating is performed on-the-fly at runtime in response to the segmenting of the search query.

7. The method of claim 1, wherein the calculating further comprises calculating the one or more IDHIDMs by combining values for one or more metrics of the plurality of limited lifespan objects corresponding to the documents within the document corpus that have a different combination of entities of the one or more entity types, but whose entities have a defined relationship to one another.

8. A system comprising:
a computer readable medium having instructions stored thereon, which, when executed by a processor, cause the system to:
obtain usage information about how users previously interacted, via a first user interface of an electronic device, with a plurality of limited lifespan objects in a database of objects; wherein a limited lifespan object of the plurality of limited lifespan objects corresponds to a respective document in a document corpus for which an accurate click-through-rate cannot be determined based on historical data related to the document;
identify entity types of the plurality of limited lifespan objects;
calculate one or more individual document historical information-deficient metrics (IDHIDMs) for each of the plurality of limited lifespan objects;
create a plurality of groupings including a set of limited lifespan objects of the plurality limited lifespan objects corresponding to documents that share an identical combination of entity types;
combining values for the two or more IHIDMs corresponding to a group of limited lifespan objects in each grouping of the plurality of groupings into a single combined metric for the respective grouping;
receive a search query, via a second user interface, for one or more documents;
segment the search query into a plurality of segments, wherein at least one of the plurality of segments is tagged as a first entity type and at least one of the plurality of segments is tagged as a second entity type;
retrieve from the database in response to receiving the search query, the set of limited lifespan objects by comparing the tagged segments to index terms having identical entity types as the first entity type and the second entity type;
determine, using respective ones of the single combined metric for one or more groupings of limited lifespan objects matching the tagged segments, a rank of each limited lifespan object of the set of limited lifespan objects; and
display the documents corresponding to the set of limited lifespan objects in response to receiving the search query to the user in an order dictated by the rank.

9. The system of claim 8, wherein the single combined metric is click-through-rate (CTR).

10. The system of claim 8, wherein the one or more documents are job postings.

11. The system of claim 10, wherein job postings are indexed in a job posting database using terms extracted from the job postings and assigned a plurality of different entity types.

12. The system of claim 8, wherein the obtaining, identifying, and calculating are performed offline.

13. The system of claim 8, wherein the calculating is performed on-the-fly at runtime in response to the segmenting of the search query.

14. The system of claim 8, wherein the calculating further comprises calculating the one or more IDHIDMs by combining values for one or more metrics of the plurality of limited lifespan objects corresponding to the documents within the document corpus that have a different combination of entities of the one or more entity types, but whose entities have a defined relationship to one another.

15. A non-transitory machine-readable storage medium comprising instructions, which when implemented by one or more machines, cause the one or more machines to perform operations comprising:
obtaining usage information about how users previously interacted, via a first user interface of an electronic device, with a plurality of limited lifespan objects in a database of objects, wherein a limited lifespan object of the plurality of limited lifespan objects corresponds to a respective document in a document corpus for which an accurate click-through-rate cannot be determined based on historical data related to the document;
identifying entity types of the plurality of limited lifespan objects;
calculating one or more individual document historical information-deficient metrics (IDHIDMs) for each of the plurality of limited lifespan objects;
creating a plurality of groupings including a set of limited lifespan objects of the plurality of limited lifespan objects corresponding to documents that share an identical combination of entity types;
combining values for the two or more IDHIDMs corresponding to a group of limited lifespan objects in each grouping of the plurality of groupings into a single combined metric for the respective grouping;
receiving a search query, via a second user interface, for one or more documents;
segmenting the search query into a plurality of segments, wherein at least one of the plurality of segments is tagged as a first entity type and at least one of the plurality of segments is tagged as a second entity type;
retrieving from the database in response to receiving the search query, the set of limited lifespan objects by comparing the tagged segments to index terms having identical entity types as the first entity type and the second entity type;
determining, using respective ones of the single combined metric for one or more groupings of limited lifespan objects matching the tagged segments, a rank of each limited lifespan object of the set of limited lifespan objects; and
displaying the documents corresponding to the set of limited lifespan objects in response to receiving the search query to the user in an order dictated by the rank.

16. The non-transitory machine-readable storage medium of claim 15, wherein the single combined metric is click-through-rate (CTR).

17. The non-transitory machine-readable storage medium of claim 15, wherein the one or more documents are job postings.

18. The non-transitory machine-readable storage medium of claim 17, wherein job postings are indexed in a job posting database using terms extracted from the job postings and assigned a plurality of different entity types.

19. The non-transitory machine-readable storage medium of claim 15, wherein the obtaining, identifying, and calculating are performed offline.

20. The non-transitory machine-readable storage medium of claim 15, wherein the calculating is performed on-the-fly at runtime in response to the segmenting of the search query.

* * * * *

UNITED STATES PATENT AND TRADEMARK OFFICE
CERTIFICATE OF CORRECTION

PATENT NO. : 10,726,084 B2
APPLICATION NO. : 14/975616
DATED : July 28, 2020
INVENTOR(S) : Li et al.

Page 1 of 1

It is certified that error appears in the above-identified patent and that said Letters Patent is hereby corrected as shown below:

On the Title Page

In item (57), in "Abstract", in Column 2, Line 10, after "one", insert --IDHIDM--

On page 2, in Column 1, under "Other Publications", Lines 5-6, delete "Apr. 118, 2017"," and insert --Apr. 18, 2017",-- therefor In the Claims In Column 21, Line 18, in Claim 8, delete "objects;" and insert --objects,-- therefor In Column 21, Line 33, in Claim 8, delete "IHIDMs" and insert --IDHIDMs-- therefor Signed and Sealed this
Third Day of November, 2020

Andrei Iancu
*Director of the United States Patent and Trademark Office*